United States Patent
Park

(10) Patent No.: US 12,139,033 B1
(45) Date of Patent: Nov. 12, 2024

(54) ELECTRIC VEHICLE CHARGER AND ENERGY STORAGE SYSTEM MOUNTED TRANSFORMER

(71) Applicant: CHERYONG ELECTRIC CO., LTD., Seoul (KR)

(72) Inventor: Jong Tae Park, Seoul (KR)

(73) Assignee: CHERYONG ELECTRIC CO., LTD., Seoul (KR)

(*) Notice: Subject to any disclaimer, the term of this patent is extended or adjusted under 35 U.S.C. 154(b) by 0 days.

(21) Appl. No.: 18/670,719

(22) Filed: May 21, 2024

(30) Foreign Application Priority Data

Oct. 19, 2023 (KR) .................. 10-2023-0140218

(51) Int. Cl.
*H02J 7/00* (2006.01)
*B60L 53/10* (2019.01)
*B60L 53/53* (2019.01)
*B60L 53/62* (2019.01)
*G08B 25/00* (2006.01)

(52) U.S. Cl.
CPC .............. *B60L 53/62* (2019.02); *B60L 53/11* (2019.02); *B60L 53/53* (2019.02); *G08B 25/00* (2013.01)

(58) Field of Classification Search
USPC ........................................ 320/109
See application file for complete search history.

(56) References Cited

U.S. PATENT DOCUMENTS

| | | | |
|---|---|---|---|
| 11,938,836 B2 | 3/2024 | Kim et al. | |
| 2018/0162228 A1* | 6/2018 | Götz | H02J 1/108 |
| 2018/0339595 A1* | 11/2018 | Chang | B60L 55/00 |
| 2020/0001730 A1* | 1/2020 | Gohla-Neudecker | B60L 53/11 |

FOREIGN PATENT DOCUMENTS

| | | |
|---|---|---|
| KR | 10-2014-0043007 A | 4/2014 |
| KR | 10-2018-0112994 A | 10/2018 |
| KR | 10-2019-0065906 A | 6/2019 |

(Continued)

OTHER PUBLICATIONS

KR First Office Action dated Dec. 20, 2023 as received in Application No. 10-2023-0140218.

(Continued)

*Primary Examiner* — Samuel Berhanu
(74) *Attorney, Agent, or Firm* — Maschoff Brennan

(57) ABSTRACT

The present invention relates to an electric vehicle charger and energy storage system mounted transformer which may improve efficiency of power infrastructure and promote energy saving by providing various functions such as power management, stable electric vehicle charging, fault detection, overcurrent protection, and reverse current prevention, more specifically, to an electric vehicle charger and energy storage system mounted transformer, comprising: an energy storage system which stores electricity generated from a transformer; and an electric vehicle charging device connected to the transformer or the energy storage system and charging the electric vehicle with electricity supplied from the transformer or the energy storage system, wherein the energy storage system and the electric vehicle charging device are composed of one integrated module and connected to the transformer.

12 Claims, 4 Drawing Sheets

(56) References Cited

FOREIGN PATENT DOCUMENTS

KR     10-2021-0033684 A     3/2021
KR     10-2023-0085738 A     6/2023

OTHER PUBLICATIONS

KR Second Office Action dated Jan. 19, 2024 as received in Application No. 10-2023-0140218.
KR Decision to Grant Dated Apr. 12, 2024 as received in Application No. 10-2023-0140218.

\* cited by examiner

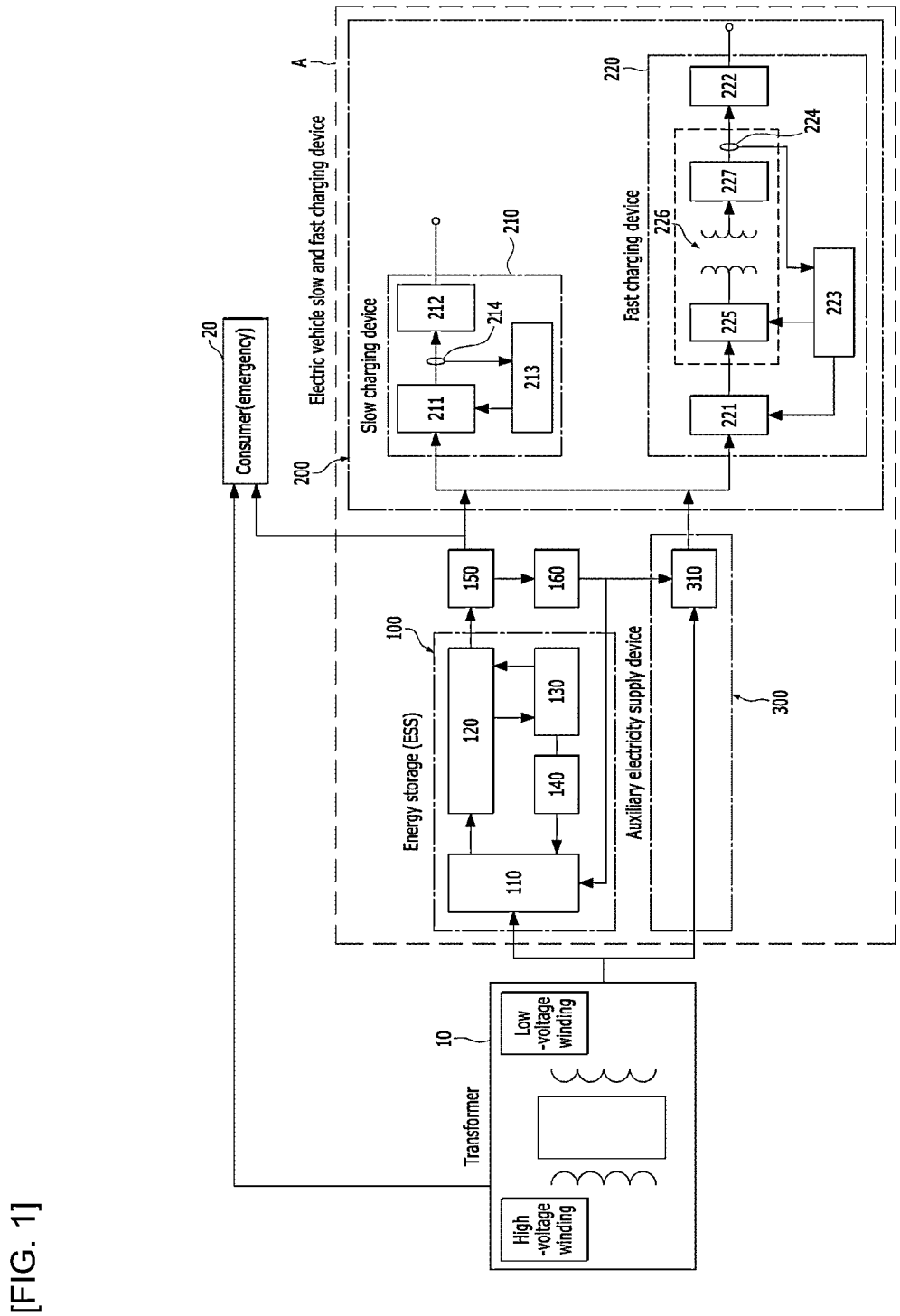
[FIG. 1]

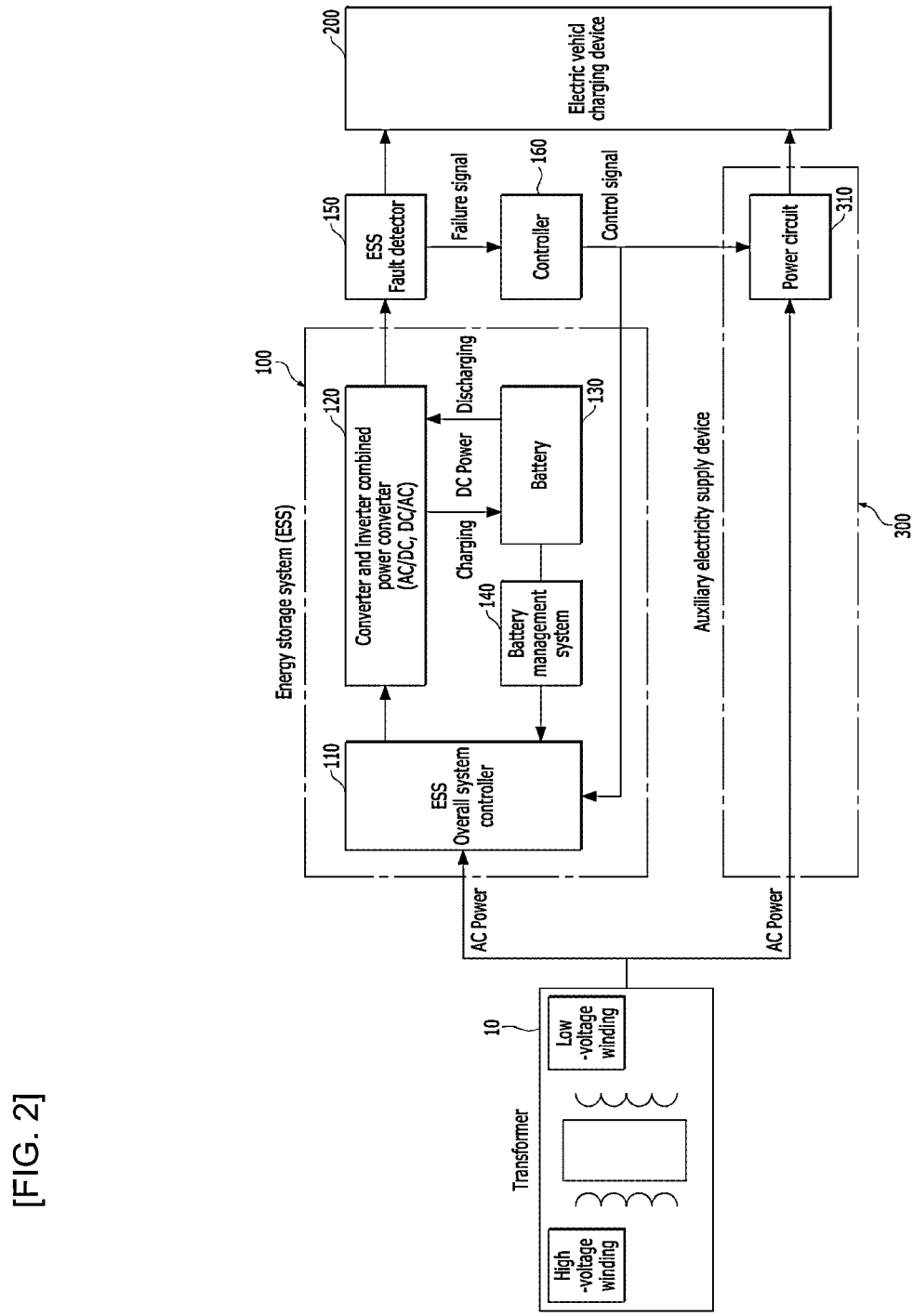
[FIG. 2]

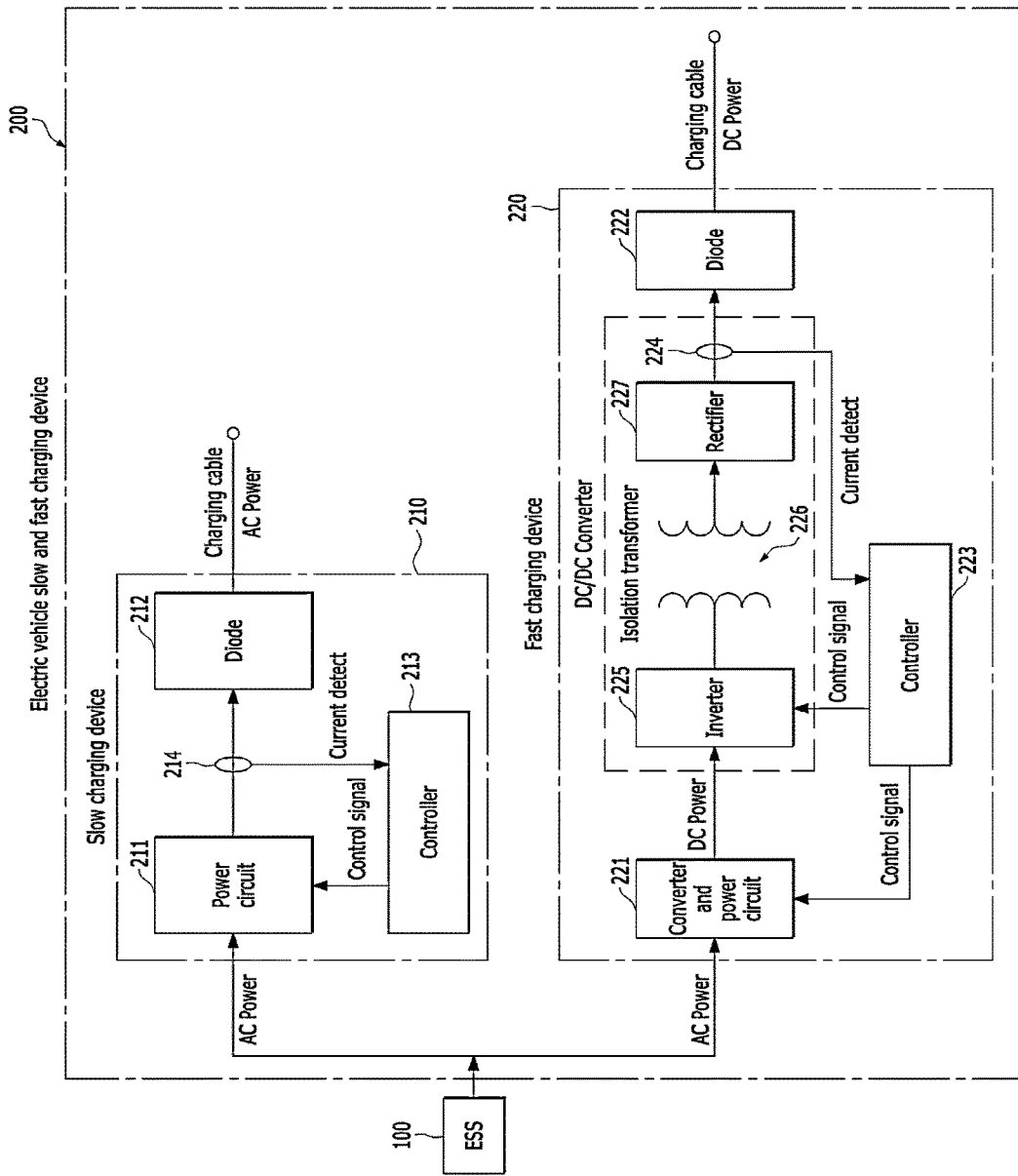
[FIG. 3]

[FIG. 4]
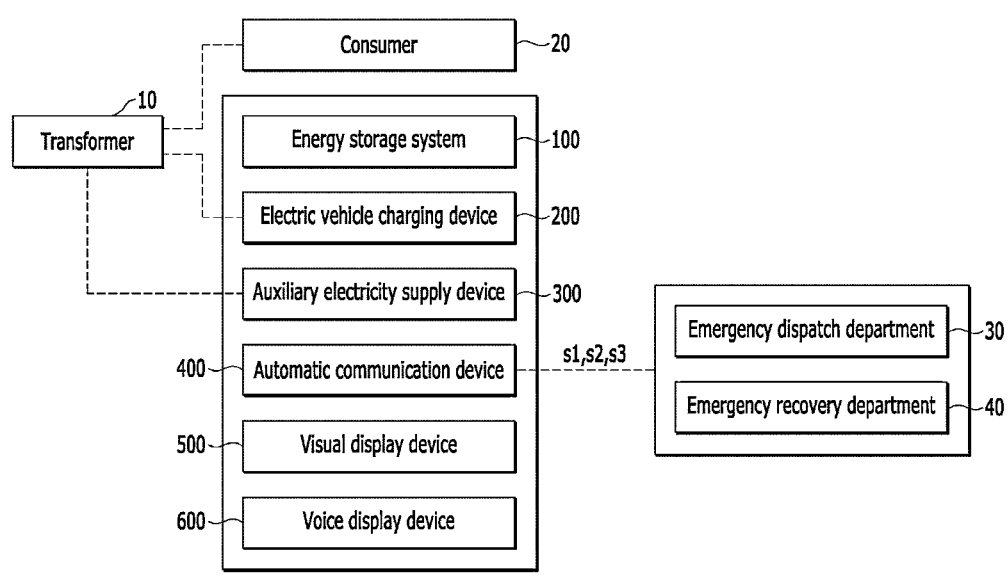

ELECTRIC VEHICLE CHARGER AND ENERGY STORAGE SYSTEM MOUNTED TRANSFORMER

TECHNICAL FIELD

The present invention relates to an electric vehicle charger and energy storage system mounted transformer which combines an electric vehicle charging device into one integrated module, and in particular, to an electric vehicle charger and energy storage system mounted transformer which may improve efficiency of power infrastructure and promote energy conservation by providing various functions such as power management, stable electric vehicle charging, fault detection, overcurrent protection, and reverse current prevention.

BACKGROUND ART

Generally, energy storage refers to storing energy using a device or physical medium. The device used for this is called an accumulator, and the broader system as a whole is called an "energy storage system (ESS)." Batteries used in ordinary homes or small batteries used in electronic products may also convert electrical energy into other forms of energy and store it, but such small-scale power storage devices are not called ESS, but stand-alone systems that store hundreds of kWh or more of power are generally called ESS.

ESS may be installed and operated in the power system for power generation, transmission and distribution, and at consumers, and is used for various functions such as frequency regulation, stabilization of new renewable generator output, peak load reduction, load leveling, and emergency power. ESS may contribute to improving energy use efficiency, improving the utilization of new renewable energy, and stabilizing the power supply system by storing electrical energy when less use is used and supplying it when needed.

A battery-type ESS is called a battery energy storage system (BESS), and generally speaking of ESS, it refers to BESS.

Meanwhile, when using a combination of a transformer and an electric vehicle charger without an ESS, the electric vehicle charging load capacity is added to the load capacity of general consumers who use electricity, resulting in an increase in the size of the transformer and an increase in price as the overall capacity of the transformer increases.

In addition, when using a combination of a transformer and an electric vehicle charger without an ESS, the load capacity of general consumers increases excessively during seasons when there is a lot of use of cooling and heating machines. At this time, if the electric vehicle load capacity is added, the risk of failure due to transformer overload is high, and in the case of electric vehicle charging load, the risk of transformer failure due to frequent load changes also increases due to intermittent use rather than continuous use.

In addition, in the case of the existing electric vehicle charger-mounted transformer, it was not possible to charge the electric vehicle when the transformer failed, so it could not be used until the transformer repair was completed.

In addition, while charging an electric vehicle, the battery's current may flow backwards into the charger circuit, which may cause the charger to operate abnormally or cause a malfunction. Previously, there was no device to prevent this.

In addition, the overcurrent blocking function is installed on the transformer side, not the charger, so if overcurrent occurs during charging, there is a risk of damage to the charger before it is cut off on the transformer side.

In addition, in the case of products that combine existing ESS and electric vehicle chargers, problems were raised that installation costs and construction periods were excessive due to cable laying work to separately supply power due to the lack of incoming power.

PRIOR ART

Patent (Patent Document 0001) Korean Patent Publication No. 10-2018-0112994
(Patent Document 0002) Korean Patent Publication No. 10-2023-0085738

SUMMARY OF THE INVENTION

Technical Problem

The technical problem to be solved by the present invention is to solve the problems of the existing charging system described above and to provide an electric vehicle charger and energy storage system mounted transformer which may perform the electric vehicle charging process more safely and efficiently.

Another technical problem that the present invention aims to solve is to provide an electric vehicle charger and energy storage system mounted transformer which may improve the efficiency and stability of the entire system and promote energy conservation by configuring the ESS, an electric vehicle charging device, and an auxiliary electricity supply device into one integrated module.

The technical problems to be achieved in the present invention are not limited to the technical problems mentioned above, and other technical problems not mentioned will be clearly understood by those skilled in the art from the description below.

Means for Solving the Problem

The present invention's electric vehicle charger and energy storage system mounted transformer for achieving the above technical problem includes an energy storage system which stores electricity generated from a transformer; and an electric vehicle charging device connected to the transformer or the energy storage system and charging an electric vehicle with electricity supplied from the transformer or the energy storage system, wherein the energy storage system and the electric vehicle charging device are composed of one integrated module and connected to the transformer.

In addition, it is characterized in that it further includes an auxiliary electricity supply device which connects or disconnects the transformer and the electric vehicle charging device, and is configured as an integrated module together with the energy storage system and the electric vehicle charging device.

In addition, it is characterized in that when the transformer and the electric vehicle charging device are connected to each other, the connection between the energy storage system and the electric vehicle charging device is cut off.

In addition, it is characterized in that it further includes a fault detector which detects whether the energy storage system is in a failure state, and if the energy storage system is determined to be in a failure state through the fault detector, the transformer and the electric vehicle charging device are connected to each other through the auxiliary electricity supply device, and the energy storage system and the electric vehicle charging device are disconnected from each other.

In addition, the fault detector is characterized in that it determines whether the energy storage system is broken through abnormal voltage and current states, abnormal charging and discharging rate states, and abnormal charging and discharging rate states.

In addition, the electric vehicle charging device is characterized by being composed of at least one slow charging device and at least one fast charging device.

In addition, the energy storage system is characterized in that it is charged with late-night power, and is charged through the transformer when the charge amount of the energy storage system is discharged below a set charge amount.

In addition, it is characterized in that when the transformer breaks down, electricity is supplied to consumers who receive electricity from the transformer through the energy storage system.

In addition, it is characterized in that a reverse current prevention diode is connected to the electric vehicle charging device, and the capacity of the reverse current prevention diode is 0.5 times or more than the short circuit current (Isc) and 0.6 times or more than the open circuit voltage (Voc).

In addition, it is characterized in that the electric vehicle charging device and the fast charging device are each equipped with a charging controller that controls the power circuit and output power, the charging speed and efficiency are adjusted through the charging controller, and a current detector is further disposed to block the current when overcurrent occurs.

In addition, it is characterized in that an automatic communication device connected to an emergency dispatch department through wired or wireless communication is further provided, and when a fire occurs, the automatic communication device also operates together to transmit the fire situation to the emergency dispatch department.

In addition, it is characterized in that when a fire situation is transmitted to the emergency dispatch department, location information of the place where the fire occurred is also transmitted along with information on the shortest navigation route from the emergency dispatch department to the place where the fire occurred.

In addition, it is characterized in that it further includes a visual display device which visually indicates an emergency situation; and a voice display device which provides voice guidance regarding the emergency situation.

In addition, it is characterized in that the automatic communication device is connected to the emergency recovery department through wired and wireless communication, and when a fire occurs, the automatic communication device also operates together to transmit the fire situation to the emergency recovery department.

In addition, it is characterized in that when a fire situation is transmitted to the emergency recovery department, location information of the place where the fire occurred is also transmitted along with information on the shortest navigation route from the emergency recovery department to the place where the fire occurred.

The above aspects of the present invention are only some of the preferred embodiments of the present invention, and various embodiments reflecting the technical features of the present invention may be derived and understood by those skilled in the art based on the detailed description of the present invention described below.

Effects of the Invention

The present invention described above has the following effects.

First, the efficiency of power infrastructure may be increased. In other words, by configuring an energy storage system (ESS), an auxiliary electricity supply device, and an electric vehicle charging device into an integrated module, power supply and management may be performed efficiently.

In addition, there is no need to lay separate power supply cables, reducing installation costs and time, and optimizing operating costs through energy storage.

In addition, by using an energy storage system, it is possible to optimize load management of power transformers and provide stability against overload or intermittent load fluctuations.

In addition, by including a fault detector, it is possible to quickly detect whether the energy storage system is broken and supply power safely.

In addition, by using a reverse current prevention diode and current detector, the safety of the charging system may be strengthened and the charger and electric vehicle may be protected from overcurrent.

In addition, it may store excess power at night to promote energy conservation and support sustainable power management.

In addition, ESS enables stable charging of electric vehicles and emergency power supply even in the event of a power transformer failure.

In addition, the present invention includes an automatic communication device for communication with the emergency dispatch department, and when the automatic fire extinguishing system operates in the event of a fire, the fire situation is simultaneously transmitted to the emergency dispatch department, and information on the shortest navigation route to reach the location of the fire may also be transmitted. Additionally, response capabilities may be greatly improved by visually displaying emergency situations and providing voice guidance through visual and audio display devices.

The effects which may be obtained from the present invention are not limited to the effects mentioned above, and other effects not mentioned will be clearly understood by those skilled in the art from the description below.

BRIEF DESCRIPTION OF THE DRAWINGS

FIG. 1 is a schematic view of the overall configuration according to an embodiment of an electric vehicle charger and energy storage system mounted transformer of the present invention.

FIG. 2 is a schematic view showing the configuration of an energy storage system and an auxiliary electricity supply device according to an embodiment of an electric vehicle charger and energy storage system mounted transformer of the present invention.

FIG. 3 is a schematic view showing the configuration of an electric vehicle charging device according to an embodiment of an electric vehicle charger and energy storage system mounted transformer of the present invention.

FIG. 4 is a schematic view of the overall configuration according to another embodiment of an electric vehicle charger and energy storage system mounted transformer of the present invention.

DETAILED DESCRIPTION OF THE EMBODIMENTS

Hereinafter, some embodiments of the present invention will be described in detail through illustrative drawings. When adding reference numerals to components in each drawing, it should be noted that identical components are given the same reference numerals as much as possible even if they are shown in different drawings. Additionally, when describing embodiments of the present invention, if detailed descriptions of related known configurations or functions are judged to impede understanding of the embodiments of the present invention, the detailed descriptions will be omitted.

Additionally, when describing the components of an embodiment of the present invention, terms such as first, second, A, B, (a), and (b) may be used. These terms are only used to distinguish the component from other components, and the nature, order, or turn of the component is not limited by the term. When a component is described as being "connected," "coupled," or "accessed" to another component, the component may be directly connected or accessed to the other component, but it should be understood that the component may be "connected," "coupled," or "accessed" between each component.

FIG. 1 is a schematic view of the overall configuration according to an embodiment of an electric vehicle charger and energy storage system mounted transformer of the present invention, FIG. 2 is a schematic view showing the configuration of an energy storage system and an auxiliary electricity supply device according to an embodiment of an electric vehicle charger and energy storage system mounted transformer of the present invention, and FIG. 3 is a schematic view showing the configuration of an electric vehicle charging device according to an embodiment of an electric vehicle charger and energy storage system mounted transformer of the present invention.

First, with reference to FIGS. 1 to 3, the structure according to an embodiment of an electric vehicle charger and energy storage system mounted transformer of the present invention will be described as follows.

The present inventor's electric vehicle charger and energy storage system mounted transformer may store AC power generated on the of the transformer (10) in an energy storage system (ESS) (100). Power stored in the ESS (100) may be converted into electric vehicle charging power through an electric vehicle charging device (200) and supplied to the electric vehicle. At this time, power for storing the ESS (100) may mainly use late-night power. Of course, a customer (20) may also receive electricity from the transformer (10).

In addition, the electric vehicle charger and energy storage system mounted transformer of the present invention, may supply the power stored in the ESS (100) to the electric vehicle through the electric vehicle charging device (200) or as emergency power at the customer (20) when the transformer (10) breaks down. In other words, electricity may be used without interruption for a certain period of time even while the transformer (10) is being repaired.

In addition, in the electric vehicle charger and energy storage system mounted transformer of the present invention, when the ESS (100) breaks down, the electric vehicle charging device (200) may receive electricity directly from the transformer (10).

The electric vehicle charger and energy storage system mounted transformer according to the present invention may be configured to include the ESS (100) connected to the transformer (10), and the electric vehicle charging device (200) connected to the ESS (100) or the transformer (10). In addition, it may further include an auxiliary electricity supply device (300) that directly connects the transformer (10) and the electric vehicle charging device (200) to each other, or connects the electric vehicle charging device (200) to the ESS (100) connected to the transformer (10). At this time, the ESS (100) and the electric vehicle charging device (200) may be configured as one module. Additionally, the ESS (100), the electric vehicle charging device (200), and the auxiliary electricity supply device (300) may be configured as one module. Through modularization, the present invention may be configured by additionally installing modules without changing the existing transformer structure, and since cable laying work for separate power supply is not required, installation costs may be reduced and the construction period may be shortened. In addition, the load facility capacity used by general consumers (20) is covered by the transformer (10), and the intermittently generated electric vehicle charging load capacity may reduce the size of the transformer (10) and reduce the price by using the power stored in the ESS (100). Generally, there are various loads in a power network. This load may refer to the amount of electricity used in homes, offices, factories, commercial facilities, etc. Electric vehicle charging may also occur intermittently due to additional load. To supply these loads, transformers and electrical equipment with sufficient capacity are needed in the power network. Accordingly, it may require large transformers and electrical equipment. However, the present invention may support electric vehicle charging by utilizing power stored in the ESS (100) instead of directly processing the electric vehicle charging load in the power network. In other words, when electric vehicle charging occurs, the power stored in the ESS (100) is used, so it does not significantly affect the load of the power network, allowing existing loads and electric vehicle charging to be handled using smaller transformers and electrical equipment.

The transformer (10) may include any transformer disposed at a location capable of charging an electric vehicle. For example, the transformer (10) may be comprised of a ground transformer.

The ESS (100) may be connected to the transformer (10) and the electric vehicle charging device (200). The ESS (100) may be configured to include an ESS overall system controller (110), a converter and inverter combined power converter (120), a battery (130), and a battery management system (140), and may be configured to further include a fault detector (150) and a controller (160). Of course, the fault detector (150) and the controller (160) may be configured as separate devices connected to the ESS (100).

The ESS overall system controller (110) may perform key control and monitoring roles of the ESS (100).

The ESS overall system controller (110) may manage the energy flow and charging and discharging of the ESS (100). This may be adjusted depending on the connection status between the transformer (10) and the electric vehicle charging device (200).

In addition, the ESS overall system controller (110) may optimize interaction with the power network by controlling the charging and discharging of the ESS (100), and may promote efficient use of energy by optimizing energy storage and release.

The ESS overall system controller (110) may perform safety and fault detection of the ESS (100) and, if necessary, may maintain a stable power supply by controlling the auxiliary electricity supply device (300).

The ESS overall system controller (110) may be connected to the converter and inverter combined power converter (120), the battery (130), the battery management system (140), etc. in a normal operating state to perform the above-described operations.

When the ESS overall system controller (110) detects a failure state of the ESS (100) through the fault detector (150), it may recognize the failure state, and if necessary, may control the operating state of the ESS (100) or activate the auxiliary electricity supply device (300) to maintain safe power supply. That is, it may be configured so that the connection between the ESS (100) and the electric vehicle charging device (200) is released, and the transformer (10) and the electric vehicle charging device (200) are directly connected to each other.

The converter and inverter combined power converter (120) is a device which simultaneously performs the roles of a converter and an inverter, and may be used to charge input power to the battery (130) or output power stored in the battery (130) through an inverter.

The converter and inverter combined power converter (120) may convert direct current (DC) power to alternating current (AC) or vice versa, and may perform the necessary conversion during the charging and discharging process of the ESS (100).

In addition, the converter and inverter combined power converter (120) may play a role in managing and stabilizing power quality, and provide voltage and frequency regulation and high-quality power supply.

The converter and inverter combined power converter (120) may provide functions necessary for fault detection and protection of the ESS (100). The converter and inverter combined power converter (120) may monitor the internal state of the ESS (100) and share information about this with the fault detector (150).

The converter and inverter combined power converter (120) may provide an interface which enables real-time monitoring and remote control by communicating with the ESS overall system controller (110)

The battery (130) may be composed of high-capacity battery modules, and the battery modules may be composed of several battery cells, and these modules may be connected in parallel or series to form a battery pack.

The high-capacity battery modules are made up of small battery cells, which may generate and store voltage and current.

The BMS (140) may monitor the status of battery cells and track the voltage, current, and temperature of each cell.

In addition, the BMS (140) may control each cell in the battery module to maintain balance and prevent overcharging or discharging.

In addition, the BMS (140) may maintain optimal performance and stability by managing the charging and discharging process of the battery (130), and may extend the life of the battery (130) by monitoring the temperature within the battery module and controlling operation at temperatures which are too high or too low.

The BMS (140) may detect a failure inside the battery (130) and, maintain safety by issuing a warning or disabling the battery module when necessary.

The fault detector (150) is not shown, but may include a voltage sensor, a current sensor, and a temperature sensor.

The voltage sensor may monitor the voltage of the ESS (100) to detect overvoltage or undervoltage conditions. The current sensors may detect over or under current by tracking changes in current. The temperature sensors may detect overheating or excessive cooling by monitoring the temperature inside the battery and the device.

The fault detector (150) may identify potential failures by analyzing data collected from sensors and checking patterns. For example, alerts may be triggered when fixed thresholds are exceeded or unusual behavior is detected.

The fault detector (150) may detect a failure state through abnormal voltage and current, abnormal charging and discharging rates, and abnormal charging and discharging rates of the ESS (100).

The fault detector (150) may install voltage and current sensors in the ESS (100) to determine abnormal voltage and current states, and continuously monitor the voltage and current of the power system through these sensors. It may also define normal operating ranges and set thresholds for failure when voltage and current fall outside these ranges. When the voltage or current exceeds or falls below the set threshold, it is judged to be in an abnormal state and may be judged as a failure.

The fault detector (150) may monitor the charging and discharging speed of the ESS (100) to determine whether the charging and discharging speed is abnormal. The charging and discharging speed indicate how the amount of energy changes. It may set the expected range of charging and discharging speed within the normal operating range, and set a threshold to detect abnormal rates based on this. When the charging or discharging speed exceeds or falls below the set threshold, it is judged to be in an abnormal state and may be judged as a failure.

The fault detector (150) may track how quickly power is supplied or discharged by monitoring the charging and discharging rates of the ESS (100) to determine whether the charging and discharging rates are abnormal. It may define normal charging and discharging rate ranges and set thresholds to detect abnormal rates. When the charging and discharging rate exceeds or falls below the set threshold, it may be judged to be in an abnormal state and be judged as a fault.

The fault detector (150) may immediately generate an alarm and take safe measures when a fault is discovered. That is, the operation of the ESS (100) may be changed or stopped and measures may be taken to prevent the fault from spreading to other system components.

The fault detector (150) may record and report fault history to assist in the operation of the ESS (100) and analysis of fault patterns.

When the ESS (100) operates normally, a power circuit (310) of the auxiliary electricity supply device (300) may be in a blocked state.

The fault detector (150) may transmit a failure signal to the controller (160) and send a from the controller (160) to the power circuit (310) of the auxiliary electricity supply device (300) to open the power circuit. That is, the electric vehicle may be charged by directly supplying electricity from the transformer (10) to the electric vehicle charging device (200).

The electric vehicle charging device (200) may be configured to include at least one slow charging device (210) and at least one fast charging device (220).

The slow charging device (210) may be connected to the ESS (100) or to the low voltage side of the transformer (10).

The slow charging device (210) may receive power from the ESS (100) through a power circuit (211), or may receive AC power from the low-voltage side of the transformer (10). The power circuit (211) may convert the applied AC power into necessary voltage and current through a power converter. The power circuit (211) may include a power management control unit (not shown). The power management control unit may monitor the charging process, adjust the charging speed, detect overcurrent and overvoltage, and adjust them or block the system. Additionally, the power circuit (211) may include various protection devices to prevent fire, overheating, short circuit, overvoltage, etc. which may occur during charging. The power circuit (211) may be configured in a modular manner.

The voltage and current converted through the power circuit (211) may be supplied to the electric vehicle through a charging cable or to the slow charging device (210).

The slow charging device (210) may include a charging cable (drawing number not shown) connected to the electric vehicle. The charging cable may be responsible for transmitting power and data between the electric vehicle and the charging device.

A charging controller (213) may monitor and control the charging process. The charging controller (213) may detect the charging state and battery capacity of the electric vehicle and adjust the optimal charging speed and power. Additionally, it may schedule charging times or manage charging modes set by the user.

A current detector (214) may monitor and manage the current generated during charging. The current detector (214) may stop charging when overcurrent occurs and cut off the power supply for system safety. In other words, when overcurrent occurs, information about this is detected by the charging controller (213), and the charging controller (213) may block the power circuit (211).

Meanwhile, it is desirable to install the current detector (214) in the slow charging device (210) rather than in the transformer (10). The current detector (214) may prevent damage to the slow charging device (210) and the electric vehicle by controlling the charging speed and efficiency through the charging controller (213) and at the same time cutting off the current for a short period of time when overcurrent occurs during charging. In other words, if the overcurrent blocking function is installed on the transformer (10) side rather than the slow charging device (210) side, there is a very high possibility which the slow charging device (210) will be damaged before the current is cut off on the transformer (10) side when overcurrent occurs during charging. Meanwhile, if the voltage detected by the current detector (214) exceeds 1.5 times the battery voltage, it may be determined that overcurrent has occurred.

A user may connect the electric vehicle and the slow charging device (210) using a charging cable.

When the electric vehicle requests slow charging, the charging controller (213) may control the charging operation. A charging request may be made through communication between the charging port of the electric vehicle and the slow charging device (210).

The charging controller (213) may determine the power and current required for charging by considering the current battery state of the electric vehicle and the charging mode requested by the user. Through this, it may control the charging speed and safely charge the battery.

When charging is complete, the charging controller (213) may stop charging and send a notification to the user. The notification may be sent to users through display devices and speakers, and users who receive the notification may disconnect the charging cable and use the electric vehicle.

Meanwhile, a reverse current prevention diode (212) may be connected to the power circuit (211). The capacity of the reverse current prevention diode (212) is preferably 0.5 times or more than the short-circuit current (Isc) and 0.6 times or more than the open-circuit voltage (Voc). At this time, if the capacity of the reverse current prevention diode (212) is less than 0.5 times the short-circuit current or less than 0.6 times the open-circuit voltage, the reverse current prevention efficiency may be reduced.

Next, the fast charging device (220) will be described. However, since the basic connection configuration and operating state of the fast charging device (220) are the same as those of the slow charging device (210), the description of the above-described slow charging device (210) will be referred to and will be briefly described. In addition, since the configuration of an AC/DC converter, inverter (225), an (226), and a rectifier (227) which constitute the fast charging device (220) is a known technology, only the connection status will be briefly described.

Referring to FIG. 3, the fast charging device (220) may also be connected to the ESS (100) or to the low voltage side of the transformer (10). The fast charging device (220) may also receive AC power from the low-voltage side of the ESS (100) or the transformer (10) through a power circuit (221). The power circuit (221) may convert the applied AC power into necessary voltage and current through a power converter. The power circuit (221) may be equipped with an AC/DC converter, through which AC power may be converted into DC power and transmitted to the inverter (225). The inverter (225) may be connected to the rectifier (227) through the isolation transformer (226). The rectifier (227) may be connected to a reverse current prevention diode (222). Additionally, a current detector (224) may be connected to detect the current flowing from the rectifier (227) to the reverse current prevention diode (222), and the current detector (224) may be connected to a charging controller (223).

The power circuit (221) may include a power management control unit (not shown).

The voltage and current converted through the power circuit (221) may be supplied to the fast charging device (220) through a charging cable.

The fast charging device (220) may include a charging cable (drawing number not shown) connected to the electric vehicle. The charging cable may be responsible for transmitting power and data between the electric vehicle and the charging device.

The charging controller (223) may also monitor and control the fast charging process.

An automatic power-off system may also be configured in the fast charging device (220).

The current detector (224) may monitor and manage the current generated during charging. The current detector (224) may stop charging when overcurrent occurs and cut off the power supply for system safety.

The user may connect the electric vehicle and the fast charging device (220) using a charging cable.

When the electric vehicle requests rapid charging, the charging controller (223) may control charging operations.

When charging is complete, the charging controller (223) may stop charging and send a notification to the user.

FIG. 4 is a schematic view of the configuration of an electric vehicle charger and energy storage system mounted transformer according to another embodiment of the present invention, and with reference to this, the configuration and operating state according to another embodiment of the present invention will be described. Additionally, drawing numbers, etc. may refer to FIGS. 1 to 3 together.

The electric vehicle charger (100) according to the present invention may be further equipped with an automatic communication device (400) connected to an emergency dispatch department (30) through wired or wireless communication.

The emergency dispatch department (30) is a department organized to respond to various emergency situations, and may perform the role of responding to various emergency situations such as fires, accidents, and emergency situations. The emergency dispatch department (30) may be a fire department, emergency medical department, police station, rescue service, coast guard, forestry fire department, emergency communication and control center, marine police, environmental management department, emergency shelter, and relief agency. For example, the present invention may have at least one sensor associated with it for fire detection.

In addition, when transmitting a fire situation to the emergency dispatch department (30), the location information (s1) of the place where the fire occurred and the shortest navigation route information (s2) to reach the place where the fire occurred from the emergency dispatch department (30) may also be transmitted together.

The relationship between places where electric vehicle chargers are placed may be clarified through location information (s1) of the place where the fire occurred, and the emergency dispatch department (30) may quickly move to the fire location and respond through the shortest navigation route information (s2) from the emergency dispatch department (30) to the location where the fire occurred.

In addition, it may further include a visual display device (500) which visually displays an emergency situation and an voice display device (600) which provides voice guidance regarding the emergency situation.

The visual display device (500) may include a display device which displays various messages or pictures indicating an emergency situation. The display devices may be used to visually convey information in the event of an emergency.

In addition, different colors and effects may be used to represent different situations. For example, red may indicate a fire, and yellow may indicate a warning situation.

In addition, the brightness of the display device may be adjusted to optimize visibility according to surrounding lighting conditions.

In addition, depending on the emergency situation, information may be provided using text messages and icons.

The voice display device (600) may include a speaker which plays voice messages related to emergency situations. Through this, pre-recorded voice messages may be saved for various emergency situations and played back when needed.

In addition, when a system which detects an emergency situation is activated, a voice message appropriate for the situation may be automatically played.

Additionally, voice messages may be provided in various languages, and pronunciation and stress may be adjusted to make them easier to understand.

The visual display device (500) and the voice display device (600) may help enhance safety by providing quick and clear guidance to people in emergency situations. These devices may be adjusted to suit various environments and situations, and may enable rapid response in emergency situations.

Meanwhile, the automatic communication device (400) is connected to an emergency recovery department (40) through wired and wireless communication, and may transmit fire situations, etc. to the emergency recovery department (40).

The emergency recovery department (40) may be composed of an electrical team and a communication team to quickly repair or replace the transformer (10), the ESS (100), the electric vehicle charging device (200), etc.

In addition, when reporting a fire situation to the emergency recovery department (40), since the location information (s1) of the place where the fire occurred and the shortest navigation route information (s3) to reach the place where the fire occurred from the emergency recovery department (40) are also transmitted, quick movement support is possible.

The present invention described above may improve energy efficiency through innovative improvements in power infrastructure and electric vehicle charging systems and provide a safer and more convenient charging environment for users.

In the above, even though all the components constituting the embodiment of the present invention have been described as being combined or operated in combination, the present invention is not necessarily limited to this embodiment. In other words, as long as it is within the scope of the purpose of the present invention, all of the components may be operated by selectively combining one or more of them. Additionally, unless specifically stated to the contrary, terms such as "include," "comprise," or "have" as described above mean that the relevant component may be present, and should therefore be interpreted as being able to further include other components rather than excluding other components. All terms including technical or scientific terms, unless otherwise defined, have the same meaning as generally understood by a person of ordinary skill in the technical field to which the present invention pertains. Commonly used terms, such as terms defined in a dictionary, should be interpreted as consistent with the contextual meaning of the related technology, and should not be interpreted in an idealized or overly formal sense unless explicitly defined in the present invention.

The above description is merely an illustrative explanation of the technical idea of the present invention, and various modifications and variations will be possible to those skilled in the art without departing from the essential characteristics of the present invention. Accordingly, the embodiments disclosed in the present invention are not intended to limit the technical idea of the present invention, but are for illustrative purposes, and the scope of the technical idea of the present invention is not limited by these examples. The protection scope of the present invention should be interpreted in accordance with the claims below, and all technical ideas within the equivalent scope should be construed as being included in the scope of rights of the present invention.

[Description of Symbols]

| | |
|---|---|
| 10: Transformer | 20: Consumer |
| 30: Emergency dispatch department | 40: Emergency recovery department |
| 100: Energy storage system | 110: ESS overall system controller |
| 120: Converter and inverter combined power converter | |
| 130: Battery | 140: Battery management system |
| 150: Fault detector | 160: Controller |

| [Description of Symbols] | |
|---|---|
| 200: Electric vehicle charging device | 210: Slow charging device |
| 211: Power circuit | 212: Reverse current prevention diode |
| 213: Charging controller | 214: Current detector |
| 220: Fast charging device | 221: Power circuit |
| 222: Reverse current prevention diode | 223: Charging controller |
| 224: Current detector | 225: Inverter |
| 226: Isolation transformer | 227: Rectifier |
| 300: Auxiliary electricity supply device | 310: Power circuit |
| 400: Automatic communication device | 500: Visual display device |
| 600: Voice display device | |

What is claimed is:

1. An electric vehicle charger and energy storage system mounted transformer, comprising:
   an energy storage system which stores electricity generated from a transformer; and
   an electric vehicle charging device connected to the transformer or the energy storage system and charging the electric vehicle with electricity supplied from the transformer or the energy storage system, wherein the energy storage system and the electric vehicle charging device are composed of one integrated module and connected to the transformer;
   further comprising: an auxiliary electricity supply device which connects or disconnects the transformer and the electric vehicle charging device, and is configured as an integrated module together with the energy storage system and the electric vehicle charging device, wherein the connection between the energy storage system and the electric vehicle charging device is cut off when connecting the transformer and the electric vehicle charging device; and
   further comprising: a fault detector which detects whether the energy storage system is in a failure state, wherein the transformer and the electric vehicle charging device are connected to each other through the auxiliary electricity supply device when the energy storage system is determined to be in a failure state through the fault detector, and the connection between the energy storage system and the electric vehicle charging device is cut off.

2. The electric vehicle charger and energy storage system mounted transformer of claim 1, wherein the fault detector determines whether the energy storage system is malfunctioning through voltage and current abnormal states, charge and discharge rate abnormal states, and charge and discharge rate abnormal states.

3. The electric vehicle charger and energy storage system mounted transformer of claim 1, wherein the electric vehicle charging device consists of at least one slow charging device and at least one fast charging device.

4. The electric vehicle charger and energy storage system mounted transformer of claim 1, wherein the energy storage system is charged with late-night power and is charged through the transformer when the charge amount of the energy storage system is discharged below the set charge amount.

5. The electric vehicle charger and energy storage system mounted transformer of claim 1, wherein when the transformer breaks down, electricity is supplied to consumers who receive electricity from the transformer through the energy storage system.

6. The electric vehicle charger and energy storage system mounted transformer of claim 1, wherein a reverse current prevention diode is connected to the electric vehicle charging device, and the capacity of the reverse current prevention diode is 0.5 times or more than the short-circuit current (Isc) and 0.6 times or more than the open-circuit voltage (Voc).

7. The electric vehicle charger and energy storage system mounted transformer of claim 3, wherein the slow charging device and the fast charging device are each provided with a charging controller which controls a power circuit and output power, and further provided with a current detector which controls charging speed and efficiency through the charging controller and blocks current when overcurrent occurs.

8. The electric vehicle charger and energy storage system mounted transformer of claim 1, further comprising: an automatic communication device connected to an emergency dispatch department through wired and wireless communication, wherein the automatic communication device also operates together to transmit the fire situation to the emergency dispatch department in the event of a fire.

9. The electric vehicle charger and energy storage system mounted transformer of claim 8, wherein when a fire situation is transmitted to the emergency dispatch department, location information of the place where the fire occurred and information on the shortest navigation route to reach the place where the fire occurred from the emergency dispatch department are also transmitted.

10. The electric vehicle charger and energy storage system mounted transformer of claim 9, further comprising: a visual display device which visually indicates emergency situations; and a voice display device which provides voice guidance regarding the emergency situation.

11. The electric vehicle charger and energy storage system mounted transformer of claim 8, wherein the automatic communication device is connected to the emergency recovery department through wired and wireless communication, and when a fire occurs, the automatic communication device also operates together to transmit the fire situation to the emergency recovery department.

12. The electric vehicle charger and energy storage system mounted transformer of claim 11, wherein when transmitting the fire situation to the emergency recovery department, location information of the place where the fire occurred and information on the shortest navigation route to reach the place where the fire occurred from the emergency recovery department are also transmitted.

\* \* \* \* \*